US006728786B2

(12) United States Patent
Hawkins et al.

(10) Patent No.: US 6,728,786 B2
(45) Date of Patent: Apr. 27, 2004

(54) METHOD AND APPARATUS FOR SYNCHRONIZING A PORTABLE COMPUTER SYSTEM WITH A DESKTOP COMPUTER SYSTEM

(75) Inventors: Jeffrey C. Hawkins, Redwood City, CA (US); Monty Boyer, Saratoga, CA (US); Joe Sipher, Mountain View, CA (US); Lih-Shyng Tzeng, Sunnyvale, CA (US); Greg Kucala, Santa Cruz, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 09/965,243

(22) Filed: Sep. 26, 2001

(65) Prior Publication Data

US 2002/0073139 A1 Jun. 13, 2002

Related U.S. Application Data

(63) Continuation of application No. 09/318,404, filed on May 25, 1999, now Pat. No. 6,330,618, which is a continuation of application No. 08/792,166, filed on Jan. 30, 1997, now Pat. No. 6,006,274.

(51) Int. Cl.[7] .............................................. G06F 13/00
(52) U.S. Cl. ........................ 709/248; 709/201; 709/218
(58) Field of Search ................................ 709/200, 201, 709/203, 217, 218, 219, 223, 227, 248; 707/201, 202, 104; 710/100

(56) References Cited

U.S. PATENT DOCUMENTS

| 4,432,057 A | 2/1984 | Daniell et al. ............... 364/300 |
| 4,807,182 A | 2/1989 | Queen ......................... 364/900 |
| 4,866,611 A | 9/1989 | Cree et al. ................... 364/300 |

(List continued on next page.)

OTHER PUBLICATIONS

Cobb et al., "Paradox 3.5 Handbook 3.sup.rd Edition" Bantam (1991), pp. 803–816.

Alfieri, "The best book of: Wordperfect 5.0", Hayden Books (1988), pp. 153–165 and 429–435.

User Manual For PC–Link for the B.O.S.S. and the PC–link for the B.O.S.S, Traveling Software, Inc. (1989).

User Manual For Connectivity Pack for the HP 95LX, Hewlett Packard Company (1991).

Organizer Link II Operation Manual, Sharp Electronics Corporation, No Date.

"Open Network Computing–Technical Overview", Sun Technical Report, Sun Microsystems, Inc. pp. 1–32 (1987).

"Automatically Synchronized Objects", Research Disclosure #29261, p. 614 (Aug. 1988). No Copy Available.

(List continued on next page.)

*Primary Examiner*—Moustafa M. Meky
(74) *Attorney, Agent, or Firm*—Marcel K. Bingham; Hickman Palermo Truong & Becker LLP

(57) ABSTRACT

A tightly integrated palmtop computer system and personal computer system is disclosed. The palmtop computer system and personal computer system synchronize with each other to share information. The synchronization software recognizes different synchronization environments including: synchronizing multiple palmtop computer systems with a single personal computer system; synchronizing a single palmtop computer system with multiple personal computer systems; synchronizing a palmtop computer system with a remote personal computer system across a network using a local personal computer system; and remotely synchronizing with a personal computer system across a telephone line. The synchronization software handles each different synchronization environment appropriately with minimal user interaction.

57 Claims, 10 Drawing Sheets

U.S. PATENT DOCUMENTS

| | | | |
|---|---|---|---|
| 4,875,159 A | 10/1989 | Cary et al. | 364/200 |
| 4,956,809 A | 9/1990 | George et al. | 364/900 |
| 5,001,628 A | 3/1991 | Johnson et al. | 364/200 |
| 5,065,360 A | 11/1991 | Kelly | 364/900 |
| 5,142,619 A | 8/1992 | Webster, III | 395/157 |
| 5,187,787 A | 2/1993 | Skeen et al. | 395/600 |
| 5,210,868 A | 5/1993 | Shimada et al. | 395/600 |
| 5,237,678 A | 8/1993 | Kuechler et al. | 395/600 |
| 5,251,291 A | 10/1993 | Malcolm | 395/146 |
| 5,261,045 A | 11/1993 | Scully et al. | 395/161 |
| 5,261,094 A | 11/1993 | Everson et al. | 395/600 |
| 5,272,628 A | 12/1993 | Koss | 364/419 |
| 5,283,887 A | 2/1994 | Zachery | 395/500 |
| 5,301,313 A | 4/1994 | Terada et al. | 395/600 |
| 5,315,709 A | 5/1994 | Alston, Jr. et al. | 395/600 |
| 5,327,555 A | 7/1994 | Anderson | 395/600 |
| 5,333,252 A | 7/1994 | Brewer, III et al. | 395/148 |
| 5,339,392 A | 8/1994 | Risberg et al. | 395/700 |
| 5,339,434 A | 8/1994 | Rusis | 395/700 |
| 5,355,476 A | 10/1994 | Fukumura | 395/600 |
| 5,379,057 A | 1/1995 | Clough et al. | 345/173 |
| 5,392,390 A | 2/1995 | Crozier | 345/762 |
| 5,432,994 A | 7/1995 | Tokura | 29/727 |
| 5,463,772 A | 10/1995 | Thompson et al. | 395/600 |
| 5,475,833 A | 12/1995 | Dauerer et al. | 395/600 |
| 5,519,606 A | 5/1996 | Frid-Nielsen et al. | 364/401 |
| 5,537,592 A | 7/1996 | King et al. | 395/600 |
| 5,544,356 A | 8/1996 | Robinson et al. | 395/600 |
| 5,574,859 A | 11/1996 | Yeh | 395/999.999 |
| 5,592,669 A | 1/1997 | Robinson et al. | 395/600 |
| 5,598,536 A | 1/1997 | Slaughter, III et al. | 709/216 |
| 5,630,081 A | 5/1997 | Rybicki et al. | 395/159 |
| 5,640,566 A | 6/1997 | Victor et al. | 395/610 |
| 5,666,530 A | 9/1997 | Clark et al. | 395/617 |
| 5,666,553 A | 9/1997 | Crozier | 395/803 |
| 5,684,990 A | 11/1997 | Boothby | 395/619 |
| 5,696,702 A | 12/1997 | Skinner et al. | 364/999.999 |
| 5,701,423 A | 12/1997 | Crozier | 395/335 |
| 5,710,922 A * | 1/1998 | Alley et al. | 395/617 |
| 5,729,452 A | 3/1998 | Smith et al. | 364/999.999 |
| 5,900,875 A | 5/1999 | Haitani et al. | 345/349 |
| 5,953,507 A * | 9/1999 | Cheung et al. | 709/208 |
| 5,974,238 A | 10/1999 | Chase, Jr. | 395/200.78 |
| 6,006,274 A | 12/1999 | Hawkins et al. | 709/248 |
| 6,205,448 B1 | 3/2001 | Kruglikov et al. | 707/200 |
| 6,330,618 B1 * | 12/2001 | Hawkins et al. | 709/248 |

OTHER PUBLICATIONS

"FRx Extends Reporting Power Of Platinum Series: (IBM Desktop Software's Line of Accounting Software)" Doug Dayton, PC Week, v. 8, No. 5, p. 29(2), Feb. 1991.

Zahn, et al., Network Computer Architecture, pp. 1–11, 19–31, 87–115, 117–133, 187–199, 201–209 (1990).

IntelliLink Brochure (1990).

"Logical Connectivity: Applications, Requirements, Architecture, and Research Agenda," Stuart Madnick & Y. Richard Wang, MIT, System Sciences, 1991, Hawaii Int'l, vol. 1, IEEE, Jun. 1991.

* cited by examiner

METHOD AND APPARATUS FOR SYNCHRONIZING A PORTABLE COMPUTER SYSTEM WITH A DESKTOP COMPUTER SYSTEM

This application is a continuation of application Ser. No. 09/318,404, filed on May 25, 1999, now U.S. Pat. No. 6,330,618, which is a continuation of application Ser. No. 08/792,166, filed Jan. 30, 1997, now U.S. Pat. No. 6,006,274.

FIELD OF THE INVENTION

The present invention relates to the field of portable computers systems. Specifically, the present invention discloses a systems for synchronizing a portable computer system with a desktop computer system.

BACKGROUND OF THE INVENTION

Personal computer systems have become common tools in modem society. To organize their lives, many personal computer users use Personal Information Management (PIM) applications such as an address book, a daily organizer, and a To-Do list application on their personal computers. Although such Personal Information Management applications have proven useful, their utility is limited by the fact that the person must be sitting their personal computer system to access the information.

To remedy this limitation, many palmtop computer organizers have been introduced. A palmtop computer organizer is a computer that is small enough to be held in the hand of a user and runs Personal Information Management (PIM) applications such as an address book, a daily organizer, and electronic notepads. Examples of palmtop computer organizers include the Sharp® Zaurus, the Apple® Newton®, and the Tandy® Zoomer™.

However, the palmtop organizers also suffer from a number of limitations. Entering information into a palmtop organizer is usually performed by typing on a keyboard that is too small for normal typing, or by writing onto a digitizer with a stylus and relying on handwriting recognition software. Backing up the information on a palmtop organizer is often a difficult and time consuming task requiring special cables and software. Printing the information stored within a palmtop organizer system is difficult since special printer cables must connect the palmtop organizer to a printer.

SUMMARY AND OBJECTS OF THE INVENTION

It is therefore an object of the present invention to provide an easy to use palmtop computer system that is well integrated with a personal computer system. By tightly integrating the palmtop computer system with a personal computer system, an already existing computer infrastructure can easily be used by the palmtop computer system. To integrate to the computer system, the present invention teaches synchronization of information on the palmtop computer system and the personal computer system.

To integrate the palmtop computer system with a personal computer system in a user friendly manner, the palmtop computer system must be able to handle many different synchronization environments. The palmtop computer system should handle the different synchronization environments in a manner that requires very little user interaction. Thus, the palmtop computer system and the personal computer system must automatically recognized the synchronization environment and perform the synchronization.

Different synchronization environments include: synchronizing multiple palmtop computer systems with a single personal computer system; synchronizing a single palmtop computer system with multiple personal computer systems; synchronizing a palmtop computer system with a remote personal computer system across a network using a local personal computer system; and remotely synchronizing with a personal computer system across a telephone line. The software architecture of the present invention recognizes each of these different synchronization environments and performs the synchronization of information appropriately.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for implementing a palmtop computer system that is well integrated with a personal computer system is disclosed. In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention.

Basic Synchronization

Figure 1:
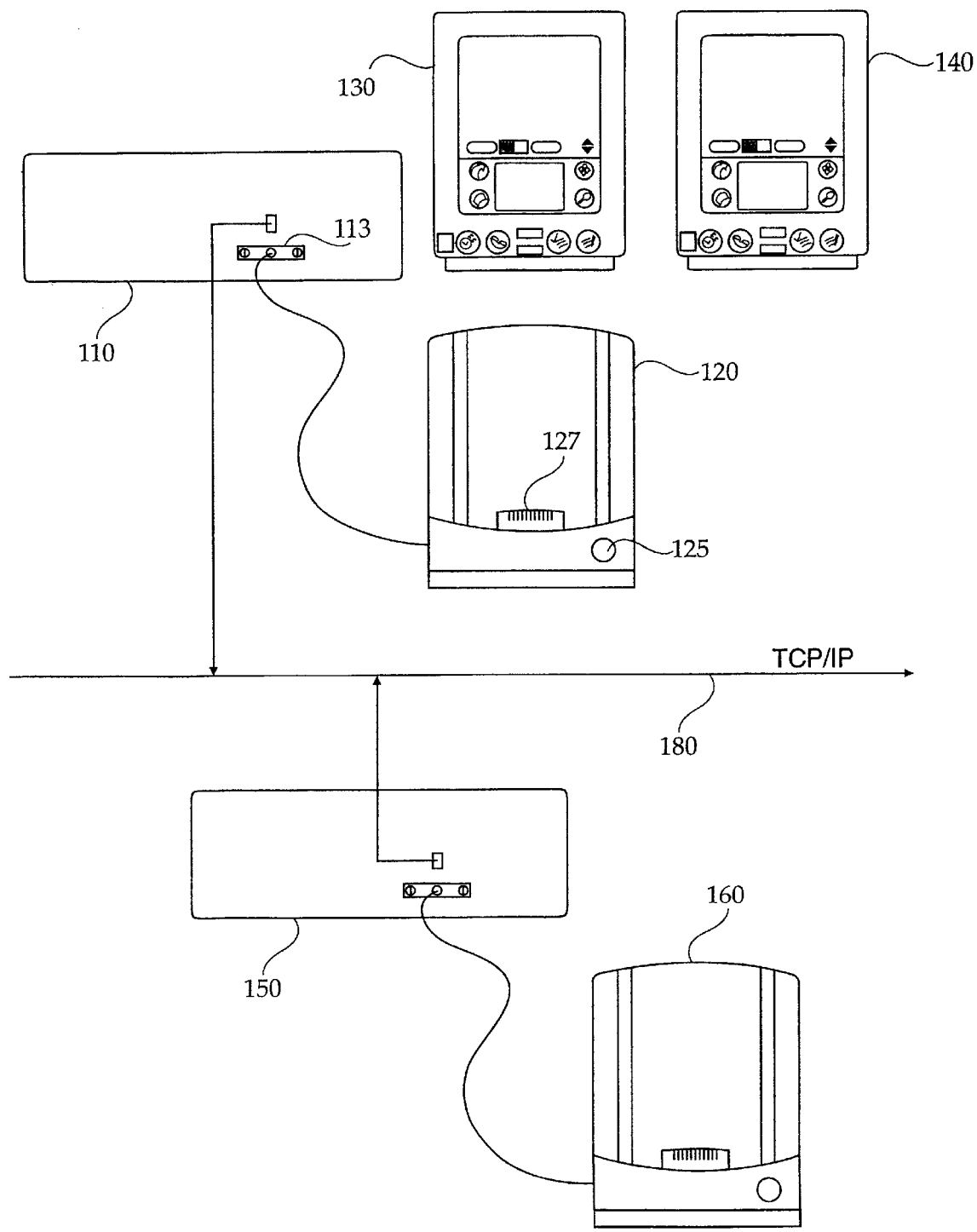
FIG. 1 illustrates a two portable computer systems and two personal computer systems equipped with cradles for synchronizing with the portable computer systems.

FIG. 1 illustrates a portable computer system 130. The portable computer system 130 may execute a number of different computer programs. However, the most common applications on the portable computer system 130 will consist of a suite of Personal Information Management (PIM) applications such as an addressbook, a daily organizer, a To-Do list, and a memo pad. Most people that use a portable computer system 130, also have a personal computer system that has the same applications. It would therefore be desirable to synchronize information between the portable computer system 130 and the personal computer system.

Also illustrated in FIG. 1 is a desktop personal computer system 110. Coupled to the serial port 113 of the desktop personal computer system 110 is a cradle 120. The cradle is used to provide a serial communication link between the portable computer system 130 and the personal computer system 110. Specifically, the serial communication lines from the serial port 113 are extended and terminate at a serial connector 127 on the cradle 120. A matching serial connector (not shown) on the portable computer system 130 connects the portable computer system 130 to the personal computer system 110.

To synchronize the information between the portable computer system 130 and the personal computer system 110, a user drops the portable computer system 130 into the cradle 120 and presses a synchronization button 125. The synchronization button 125 causes a synchronization program on the portable computer system 130 to execute. The synchronization program on the portable computer system 130 wakes up a peer synchronization program on the personal computer system 110. The synchronization program on the portable computer system 130 and the peer synchronization program on the personal computer system 110 perform the necessary operations to synchronize information stored on the two computer systems. The architecture of the synchronization process is described in the U.S. patent application entitled "Extendible Method and Apparatus for Synchronizing Multiple Files On Two Different Computer Systems" with Ser. No. 08/542,055, filed on Oct. 13, 1995, now U.S. Pat. 5,884,323.

To efficiently synchronize the information between the two computer systems, each system maintains a set of status flags for each of the data records. The status flags on each data record identify if the record is new, modified, or deleted. Thus, when a record on the portable computer system 130 or the personal computer system 110 is created, modified, or deleted, the status flags for that record are set to new, modified, or deleted respectively. The status flags on the data records greatly simplify the synchronization process since only the new, modified, or deleted records on each computer system need to be shared with the other computer system. After each synchronization, all the data record status flags are cleared since the two systems have identical databases after the synchronization point.

Synchronization of a Second Portable Computer System

As described in the previous section, a personal computer system can easily be equipped with a cradle 120 that allows a portable computer system 130 to synchronize with the personal computer system 110. In this manner, the information on the portable computer system 130 can be backed-up on the personal computer system 110.

Each personal computer system usually has ample resources for backing-up several portable computer systems. To back-up another portable computer system, such as portable computer 140, the second portable computer system 140 can be placed into the same cradle 120. When the synchronization button is pushed, the synchronization process begins.

In order to properly back-up the second portable computer system 140, the personal computer system 110 needs to recognize that the second portable computer system 140 is different from the first portable computer system 130 such that the data from the first portable computer system 130 is not destroyed. To accomplish this goal, each portable computer system is assigned a name. Typically, the name of the portable computer system will be the same name as the user of the portable computer system. The name of the portable computer system is assigned when the portable computer system is first synchronized.

Then, when the second portable computer 140 system is inserted into the cradle and synchronized, the personal computer system 110 will recognize that a different portable computer system is being synchronize such that a different database will be used. The first time the second portable computer system 140 is synchronized, the personal computer will ask the user if a new account should be created on the personal computer system 110 for storing information from the second portable computer 140. Thus, a second portable computer can be synchronized on a single personal computer.

Synchronization with a Second Desktop Computer System

The user of a portable computer system may work with more than one personal computer system. For example, many white collar workers that use a personal computer system at an office often have a second personal computer system at home. The second personal computer system allows the worker to work at night, work on weekends, or telecommute by working at home. It would be desirable to allow such a user to synchronize with both the personal computer at the office and the second personal computer system at home.

Referring to FIG. 1, a second personal computer system 150 with a second cradle 160 is illustrated. If the portable computer system 130 is placed into the second cradle 160 and the synchronization button 165 is pressed, then the portable computer system 130 will attempt to synchronize with the second personal computer system 150.

As described in a previous section, the data records on the portable computer system 130 each have flags that specified if the record is new, modified, or deleted since the last synchronization. However, these flags are only relevant to the particular personal computer system that the portable computer system 130 last synchronized with. If the portable computer system 130 has been synchronized with a first personal computer system 110 and then the user later attempts to synchronize the portable computer system 130 with the second personal computer system 150, then the status flags on the data records will only relate to the first personal computer system 110.

Thus, an interesting problem is created when a portable computer system is synchronized with a first personal computer system, used, and then later synchronized with a second personal computer system. To handle the problem, the synchronization program on each personal computer system stores a copy of the reconciled database after each synchronization. The stored database copy is not modified. Then, when a synchronization must be performed wherein the new, modified, deleted record flags are not available, then the entire contents of the portable computer database is read and compared with the stored database. This comparison will yield a set of records that have been created (new), modified, or deleted since the last synchronization. These new, modified, and delete records can then be used to synchronize with the personal computer's current database. A detailed description of this technique can be found in the U.S. patent application entitled "Method and Apparatus for Synchronizing Information on Two Different Computer Systems" with Ser. No. 08/544,927, filed on Oct. 18, 1995, now U.S. Pat. No. 5,727,202. In this document, a synchronization that requires the copy of the database from the previous synchronization is known as a "slow sync."

Before the problem of multiple synchronization hosts for a single portable computer can be solved, the problem first must be detected. To detect the problem of synchronizing with multiple personal computers, the portable computer creates a unique synchronization token after each synchronization. The synchronization token is stored by both the portable computer system and the personal computer system. Later, when a synchronization is attempted, the two systems compare synchronization tokens. If the synchronization tokens do not match, then the portable computer system's last synchronization was with a different personal computer system. In such situations, the reconciled database from the previous synchronization with this computer is fetched to perform the current synchronization.

SYNCHRONIZATION ACROSS A NETWORK

Personal computer systems are often coupled together into computer networks. When personal computer systems are coupled together into a network, each computer system can its share resources with the other computer systems coupled to the network. Similarly, each computer system can access the shared resources available from the other computer systems coupled to the network.

When a personal computer that is used to synchronize portable computers is coupled to a network, that network infrastructure can be used to route a synchronization to that "preferred" personal computer. For example, a user of a portable computer system will usually have a personal computer system that is "his" personal computer system. The user will store his personal data such his address lists, his personal calendar, and his To-Do list on his personal computer. New changes to the address list, calendar, and To-Do list will be made to his personal computer. It would therefore be desirable to always synchronize with his personal computer (a "preferred" computer).

Often, the user of a portable computer system will not be near his personal computer system. But if the user is near a personal computer that is coupled to his personal computer through a network, the user can synchronize with his personal computer using the network as a communication medium. To perform this synchronization across the network, the portable computer system must store an identifier that can be used to uniquely address the "preferred" personal computer across the network.

An example can be provided by referring again to FIG. 1. In FIG. 1, two personal computers 110 and 150 are illustrated. The two personal computers 110 and 150 are coupled together using a computer network 180. In one embodiment, the computer network 180 uses the TCP/IP suite of protocols. Personal computer 150 will be designated as the user's own personal computer (the "preferred" computer). If the user of portable computer system 130 is near personal computer 110 and wishes to synchronize with his personal computer system 150, the user simply drops his portable computer system into the cradle 120 of the nearby personal computer 110 and presses the synchronization button 125. The synchronization process then commences.

Using the identifier that uniquely addresses the "preferred" computer, the synchronization software in personal computer 110 attempts to reach the preferred computer across the network 180. If the synchronization software in personal computer 110 can reach the preferred personal computer 150 through the network 180, then the synchronization software in personal computer 110 simply acts as a pass-through and allows the synchronization software in personal computer 150 to perform the synchronization. This type of synchronization is referred to as a "net synchronization." If personal computer 110 can not reach the preferred personal computer 150 through the network 180, then the user may still synchronize with the local personal computer 110.

Obtaining Synchronization Information

As described in the previous sections the present invention uses three pieces of identification information in order to synchronize properly: a portable computer user name; a net address of the personal computer; and a unique synchronization token. These three pieces of information are initialized when the portable computer system is first synchronized. The user name for the portable computer will remain static unless the user specifically requests a change. The net address of the personal computer may change due to a request by the user or an automatic update by the synchronization software. A new unique synchronization token is created every time the portable computer system is synchronized with a personal computer system.

Figure 2:
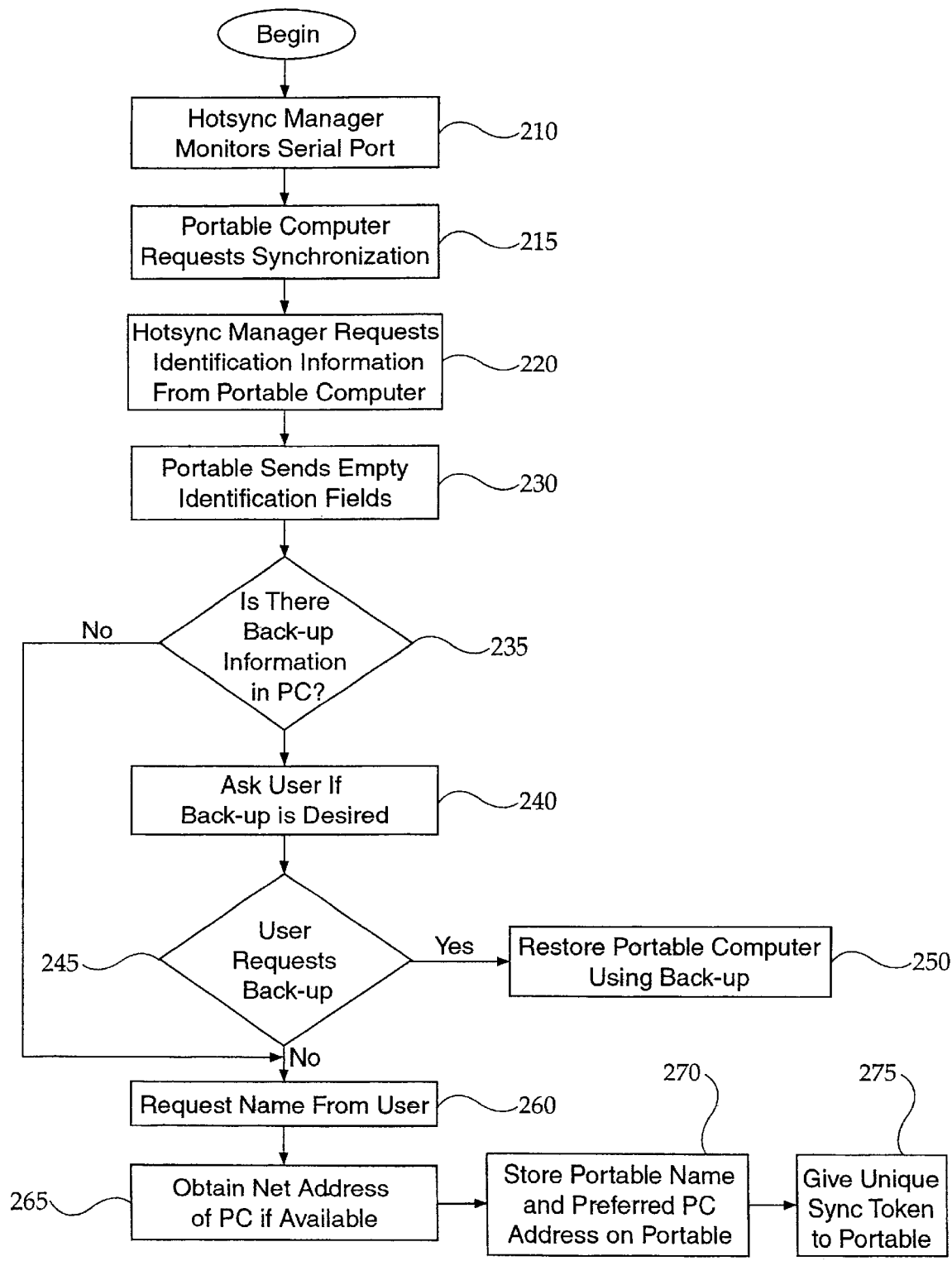
FIG. 2 illustrates a flow diagram that describes how a portable computer system acquires the identification information required to properly perform synchronizations in various environments.

FIG. 2 illustrates a flow diagram of an initialization that occurs during the first synchronization process of a portable computer system. The initialization occurs when the portable computer system is brand new and has never been used, or if all the information in the portable computer has been lost due to malfunction or complete battery discharge.

Referring to FIG. 2 the flow diagram starts where the Hot Sync Manager on the personal computer system is monitoring the serial port. (As described in previous sections, the synchronization may be performed with other communication means, but in most cases the first synchronization will be across a serial line.) Then, at step 215, the portable computer requests a synchronization. At step 220, the Hot Sync manager on the personal computer responds to the synchronization request by sending a request for the identification information on the portable computer system. At step 230, the portable computer system sends empty identification fields back to the Hot Sync Manager program on the personal computer since the portable computer system is being used for the first time or has lost all of its information.

Since the portable computer system has not sent any identification information to the Hot Sync Manager, the portable computer system is indicating that it is brand new or it has lost its information because of failure. Thus, the Hot Sync Manager on the personal computer system first determines if there is any portable computer system back-up information on the personal computer at step 235. If back-up information for a portable computer system exists on the personal computer, then at step 240 the Hot Sync Manager asks the user if he wishes to restore the portable computer system using the back-up information stored on the personal computer system. If the user requests to restore the portable computer from the back-up information, the Hot Sync Manager proceeds to step 250 where the portable computer system is restored using the back-up copy of information. Otherwise the system proceeds to step 260 where the process of initializing a new portable computer system begins.

The first step in initializing a portable computer is to request a name for the portable computer system as stated in step 260. In one embodiment, the portable computer system simply asks for the name of the intended user. The user name is assigned to the portable computer system such that the portable computer system can be identified during future synchronizations.

Next, at step 265, the Hot Sync Manager program attempts to obtain a network address for the personal computer system in order to have a "preferred" personal computer system. The Hot Sync Manager program attempts to obtain an IP address, a host name, and a SubNet Mask that will be used to locate the preferred personal computer system during future synchronization operations across a network. The user name and preferred personal computer network address are stored in the portable computer system at step 270. Finally a unique synchronization token for this synchronization session is given to the portable computer system at step 275. The unique synchronization token will be used next time the portable is synchronized to determine if it is being synchronized on the same computer system that it was last synchronized with.

Figure 3:
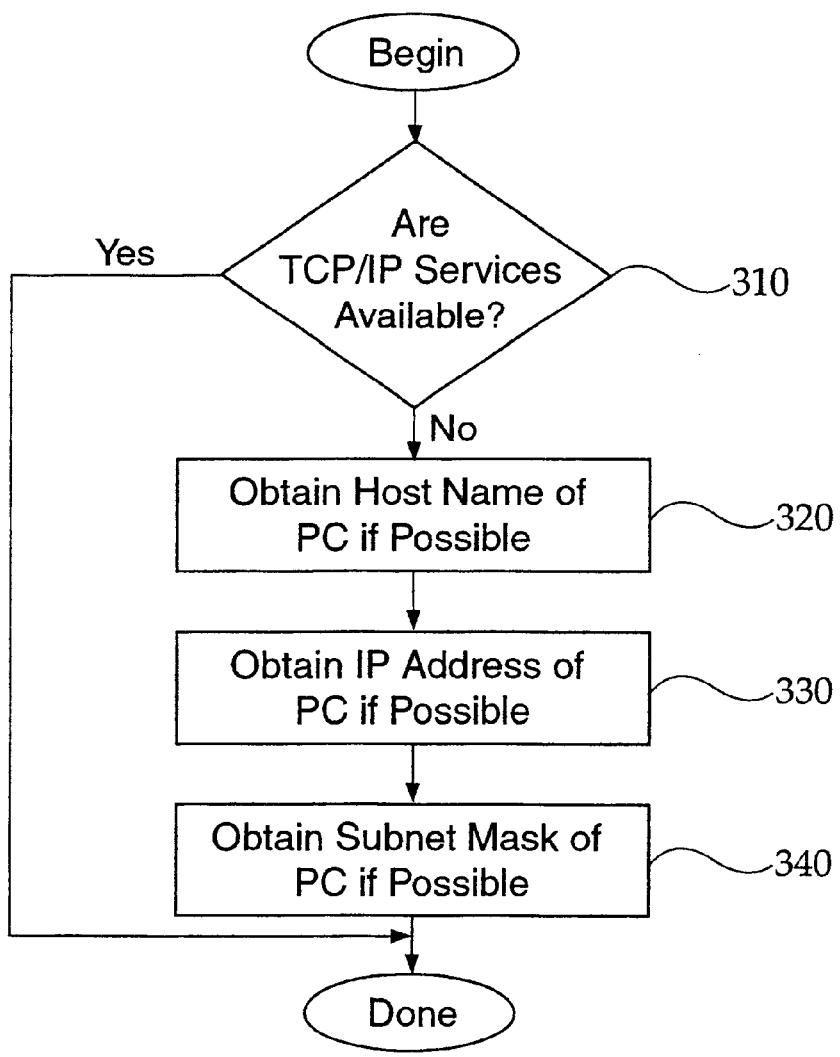
FIG. 3 illustrates a flow diagram that describes how to obtain an address for a preferred synchronization personal computer system.

FIG. 3 illustrates how the Hot Sync Manager Program obtains the network address information for the preferred personal computer. First at step 310 the Hot Sync Manager Program determines if the personal computer has TCP/IP services available. If the personal computer does not have TCP/IP protocol services then the Hot Sync Manager Program simply moves to the next step of the synchronization initialization. In an alternate embodiment, the Hot Sync program retrieves a host name for the personal computer name from a Windows registry. The host name from the registry is then later used to obtain the preferred personal computer address for synchronization operations across a network.

If the personal computer is running TCP/IP protocol, then the Hot Sync Manager proceeds to step 320 where the Hot Sync Manager obtains a host name. The host name may later be used with a Domain name service (DNS) in order to obtain an IP address for the preferred personal computer. After obtaining a host name then the Hot Sync Manager proceeds to step 330 where the Hot Sync Manager determines if the personal computer has been assigned an Internet Protocol (IP) address. If the personal computer has been assigned a IP address then that IP address is stored for future use. Finally, the Hot Sync Manager proceeds to step 340 and attempts to obtain a SubNet Mask.

The Synchronization Process

Once a portable computer system has been initialized with the proper information, the portable computer system can be synchronized with a main desktop personal computer system in a number of different ways. This section will describe how the portable computer systems synchronizes with the personal computer system with reference to the block diagram in FIG. 4 and the flow diagram in FIG. 5.

Figure 4:
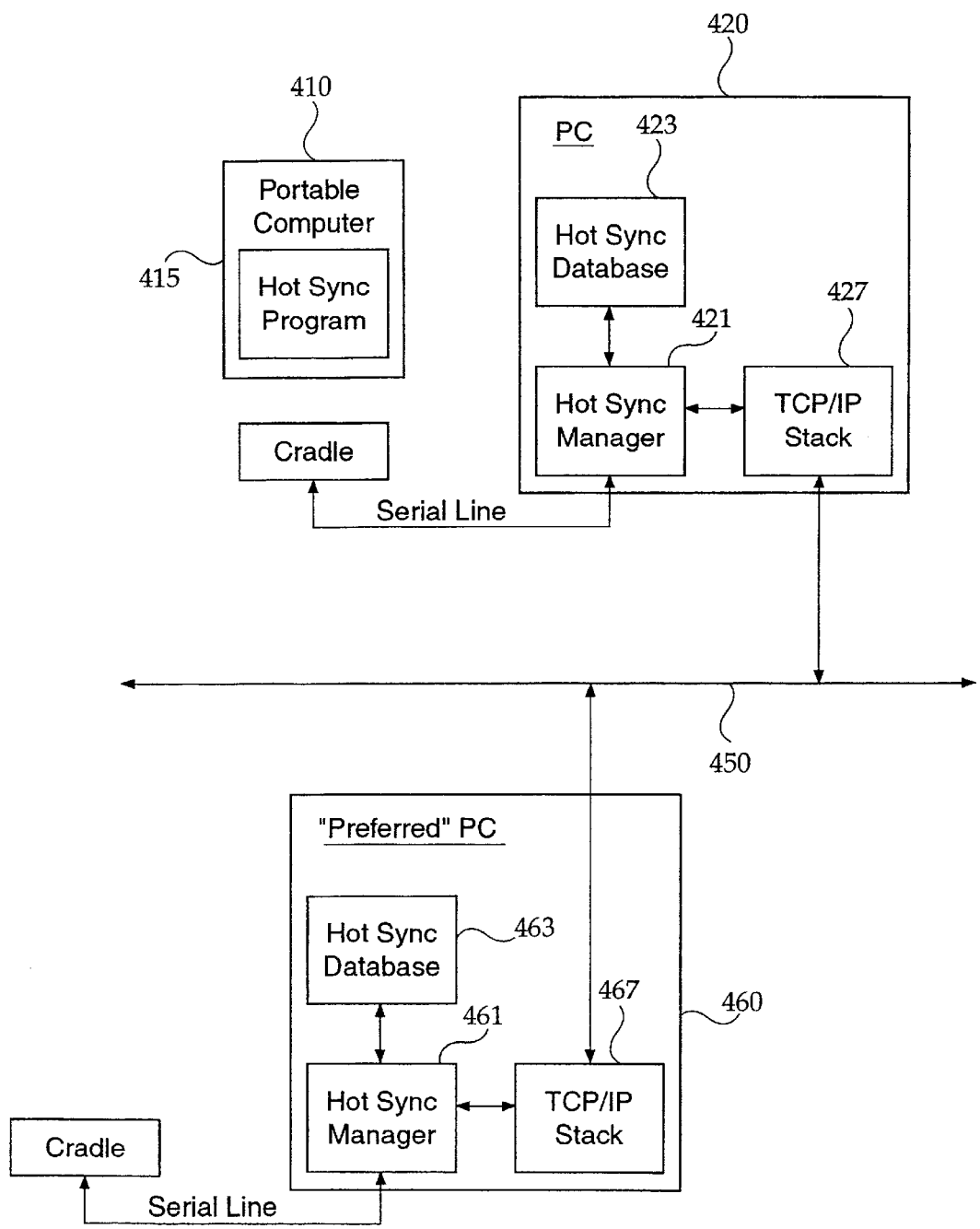
FIG. 4 illustrates a block diagram that depicts the software architecture for synchronizing a portable computer through a first personal computer to a second personal computer using a network.

FIG. 4 illustrates a block diagram of a portable computer system coupled to a personal computer through a serial line for synchronization. The personal computer 420 is also connected to a local area network 450. Other personal computers such as preferred personal computer 460 are also coupled to the network. The portable computer 410 can synchronize either with the local personal computer 420 or the preferred personal computer 460 across the network.

Figure 5A:
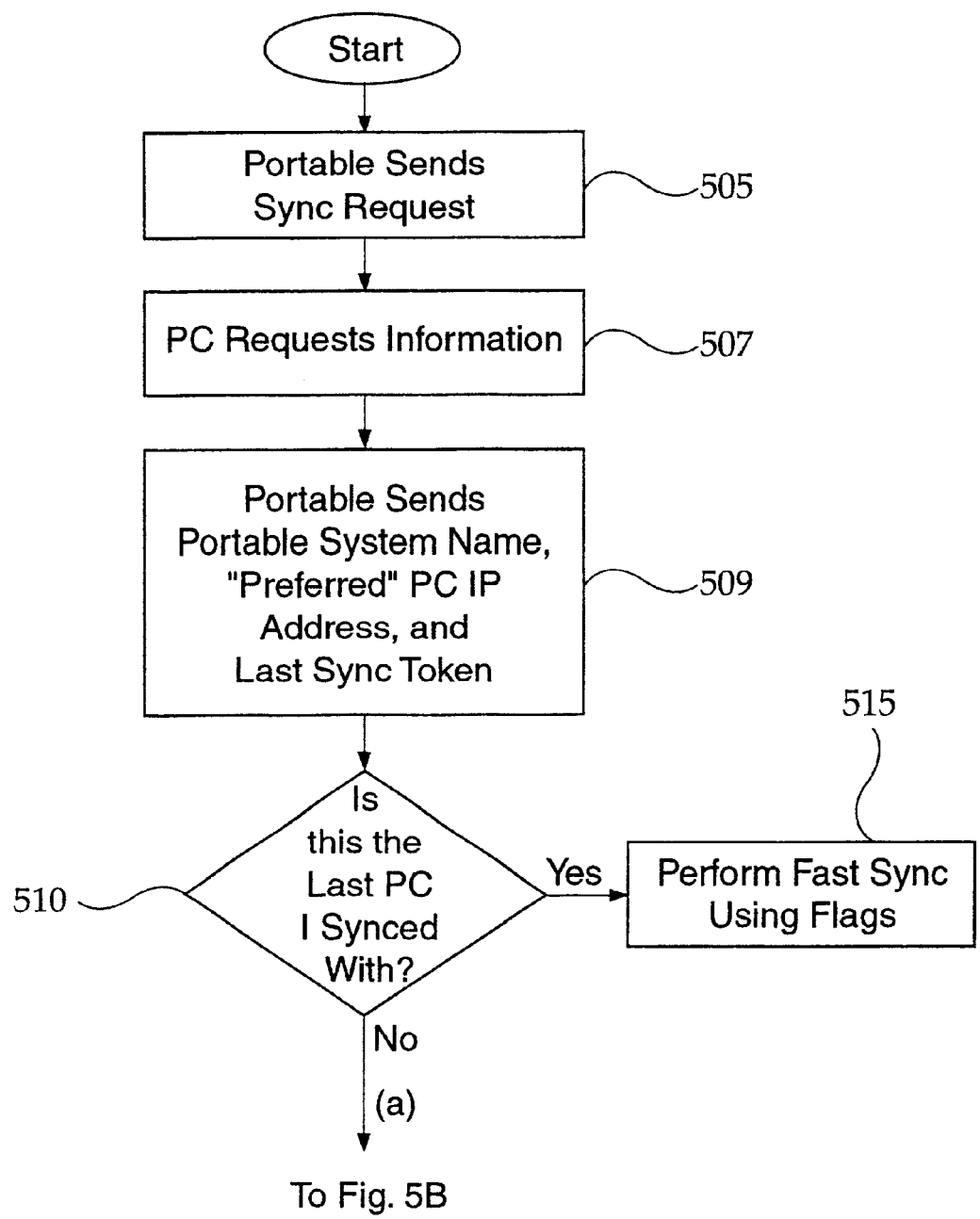
FIGS. 5a, 5b, and 5c illustrate a flow diagram that depicts the beginning of the synchronization between a portable computer system and a personal computer system.
Figure 5B:
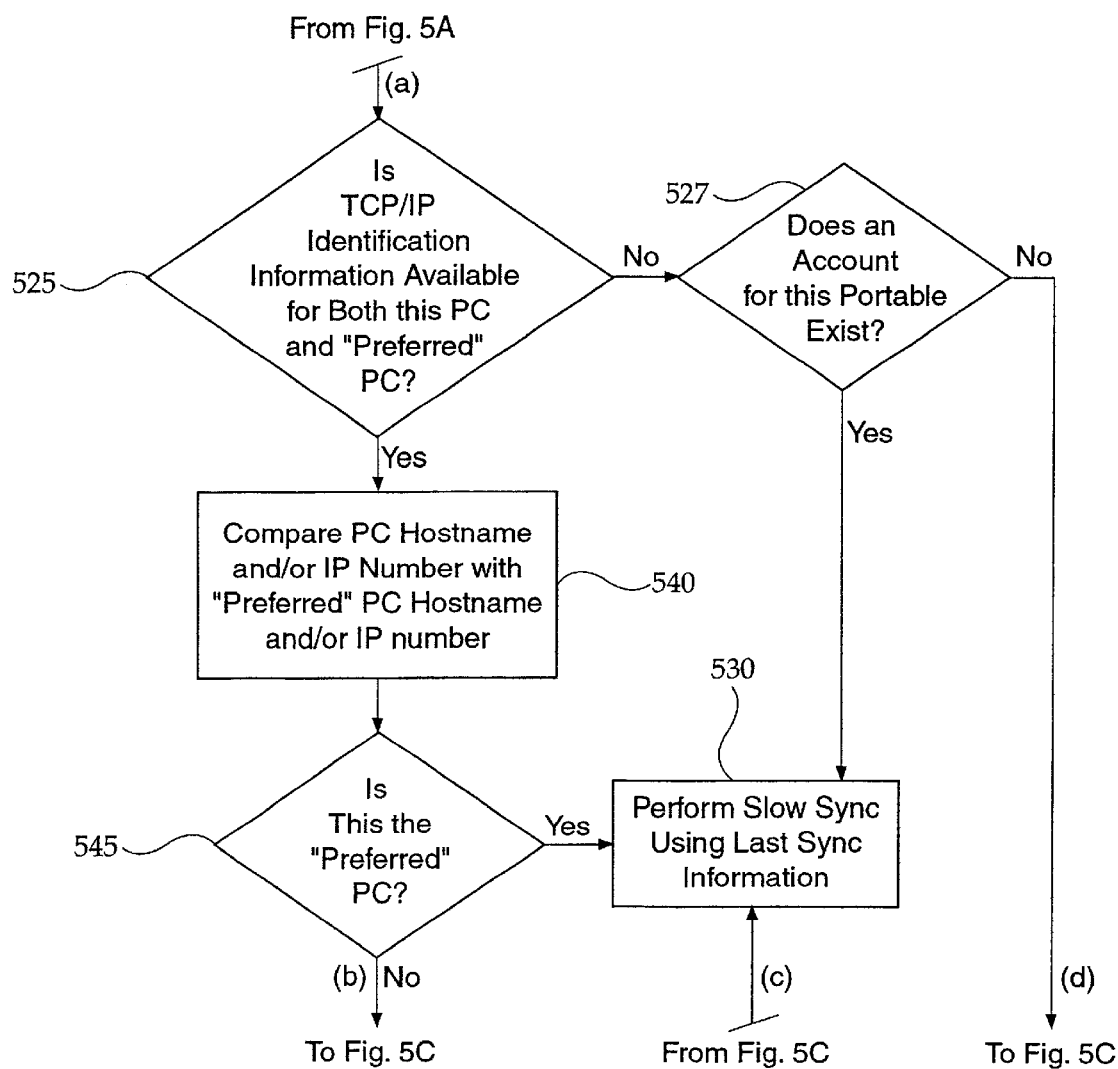
Figure 5C:
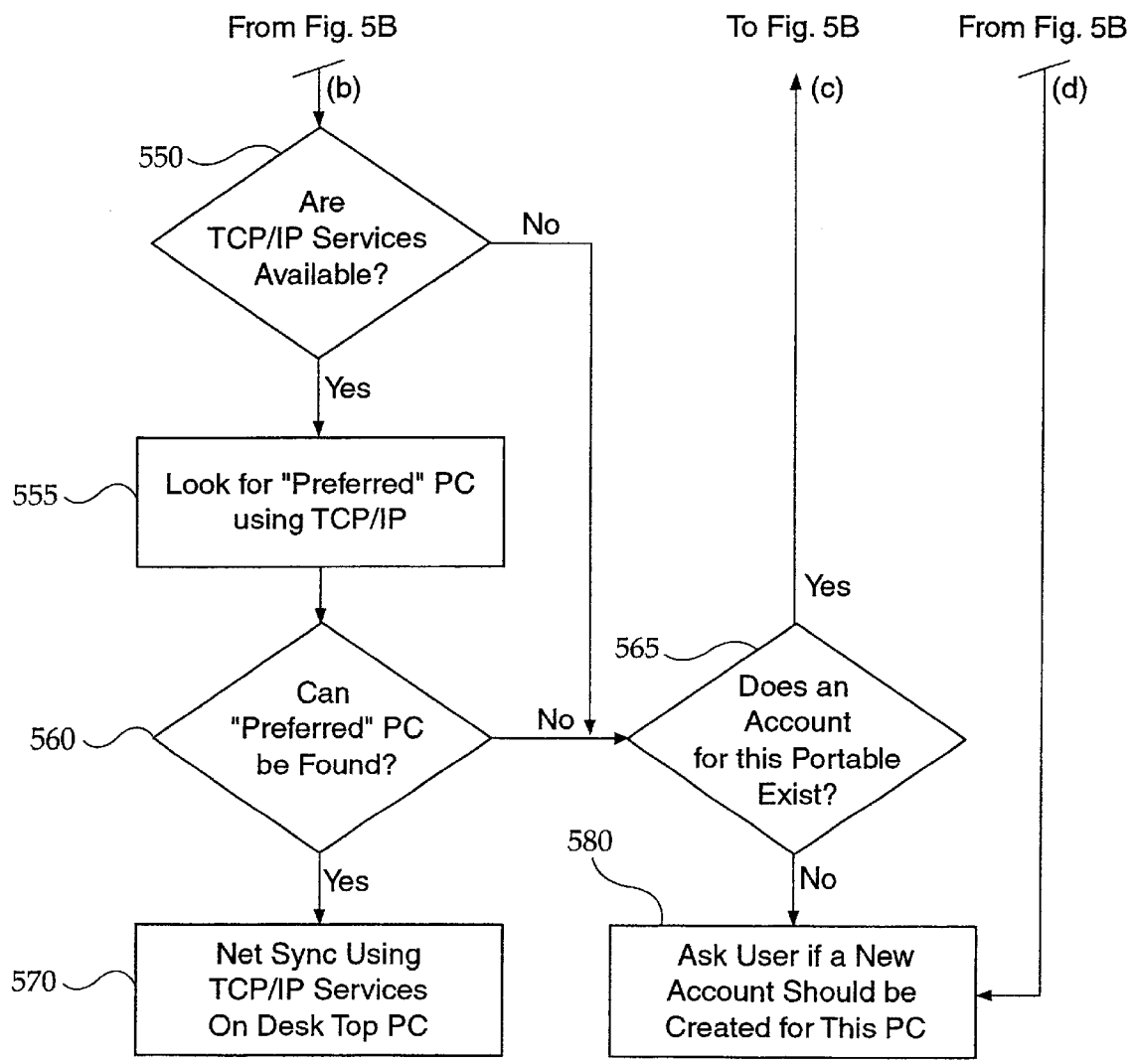

FIG. 5 illustrates a flow diagram that describes an embodiment of the synchronization process in detail. Specifically, FIG. 5 describes most of the steps performed by one embodiment of the Hot Sync Manager program 421 to determine the synchronization environment. Initially the portable computer systems sends a synchronization request at step 505. In the case where the portable computer 410 is synchronizing through a cradle as illustrated in FIG. 4, the synchronization request is carried across the serial line to the local personal computer 420. The personal computer 420 recognizes the synchronization request packet and responds by sending a request for additional information from the portable computer system 410 at step 507

In response to the request for additional information, the portable computer 410 sends the three items of identification information as previously described. Specifically, the portable computer system 410 sends the personal computer system 420 the portable system's name, a network address of the preferred personal computer, and the synchronization token received during the previous synchronization at step 509. At step 510 the synchronization program first checks the last synchronization token to determine if this is the same personal computer that the portable computer last synchronized with. If this is the same personal computer that the portable computer last synchronized with, then the Hot Sync Program immediately performs a fast synchronization at step 515.

If this is not the personal computer that the portable computer most recently synchronized with then the synchronization manager program proceeds to step 525 where it determines if network address information is available for both the personal computer 420 on which the Hot Sync Program is running and the "preferred" personal computer requested by the portable computer system.

If network address information is not available for both the current personal computer and the desired personal computer, then the Hot Sync Manager proceeds to step 527 where it may attempt to do some type of local synchronization. At step 527, the Hot Sync manager determines if an account for this portable computer exists on this personal computer. If an account exists on this personal computer for the portable then the Hot Sync Manager proceeds to step 530 where a slow synchronization is performed using the last synchronization information available for the portable computer system. If the account for this portable does not exist, the user is asked if a new account should be created at step 580.

If at step 525, the Hot Sync Manager determines that the network address information is available for both the current personal computer and the portable's preferred personal computer, then the synchronization process proceeds to step 540. At step 540 the network address of the local personal computer is compared with the network address information of the preferred personal computer. If the two addresses match, then this is the preferred personal computer but portable computer was last synchronized with another personal computer system. In such a situation, the Hot Sync Manager performs a slow synchronization using the information stored from the last synchronization with this personal computer at step 530.

If this is not the preferred the personal computer then the Hot Sync Manager proceeds to step 550 to determine if TCP/IP services are available on this personal computer. If TCP/IP services are not available then a synchronization across a network cannot be performed. Thus, the Hot Sync Manager proceeds to step 565 to determine if a local account for this portable exists. If an account exists, a slow synchronization is performed using the information stored from the last synchronization performed with this personal computer. If no local account exists then the user will be asked if a new account should be created.

However, if this is not the preferred personal computer and TCP/IP services are available, then the Hot Sync Manager will look across the network for the preferred personal computer at step 555. If the preferred personal computer can be contacted across the network then the synchronization will be performed with the preferred personal computer across the network. In this situation the local Hot Sync Program 421 merely acts as a pass-through such that all synchronization information passes from the local Hot Sync Program 421 to the remote Hot Sync Program 461 on the preferred personal computer 460. Thus, the remote Hot Sync Program 461 takes over the Synchronization process and performs a fast sync or slow sync as necessary.

Remote Synchronization

A person traveling with a portable personal computer system may want to synchronize with a desktop personal computer system while on the road. For example, a traveling executive may wish to receive calendar updates that have been placed into his personal computer by an administrative assistant. One architecture for remotely synchronizing with a desktop personal computer is illustrated in FIG. 6A.

Figure 6A:
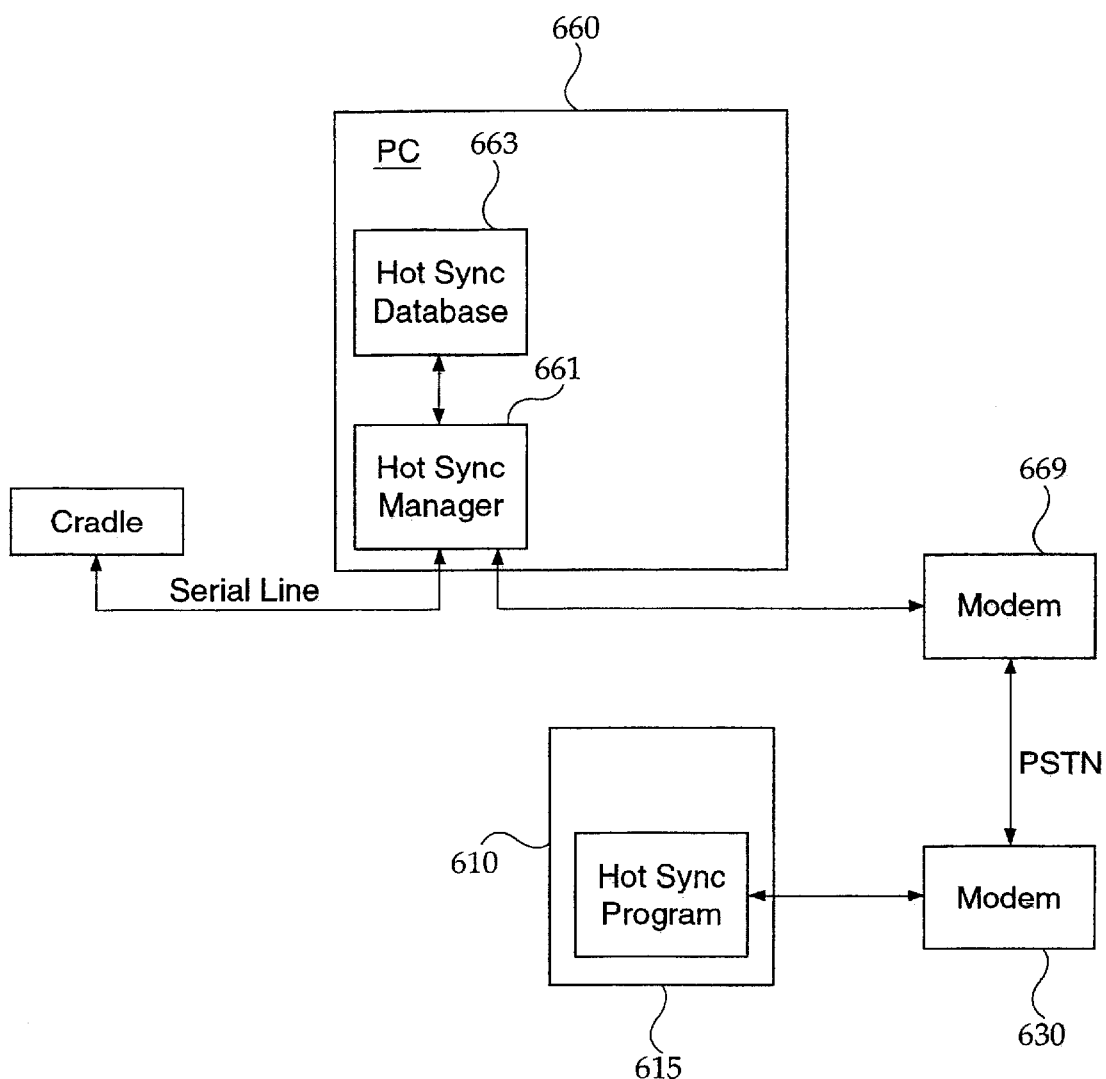
FIG. 6a illustrates a block diagram that depicts the software architecture for synchronizing a portable computer with a personal computer using two modems and the Public Switched Telephone Network (PSTN).

Referring to FIG. 6A, the portable computer 610 with its Hot Sync Program 615 is coupled to a modem 630. The Hot Sync Program 615 is configured such that it can initialize the modem 630 and dial another computer system.

Also illustrated in FIG. 6A is a personal computer system 660 with a Hot Sync Manager Program 661 and a Hot Sync database 663. To monitor for remote synchronizations the Hot sync Manager can be instructed to listen to a serial line coupled to a modem 669. If a ring signal is detected by the modem 669 the Hot Sync Manager 661 will answer the call and attempt to begin a synchronization with a remote portable computer system 610.

To synchronize remotely, the Hot Sync Program 615 on the portable computer 610 configures the modem 630 and dials the modem 669 coupled to desired personal computer 660. The modem 669 notices the ringing phone and informs the Hot Sync Manager 661 on the personal computer 660. The Hot Sync Manager program 661 response by instructing the modem 669 to answer the call. Once the call has been answered, the Hot Sync Manager program 661 listens for a synchronization token. When the Hot Sync Program 615 in the portable computer system 610 notices the call has been answered by another modem, the Hot Sync Program 615 in the portable computer system 610 sends a synchronization request token to the computer that answered. The Hot Sync Manager 661 responds to the synchronization request token by requesting the identification information from the portable computer system 610. The synchronization progresses as described in the previous sections.

Although the remote synchronization system illustrated in FIG. 6A is very useful, it suffers from a few drawbacks. The synchronization system illustrated in FIG. 6A requires a dedicated telephone line and a modem for the Hot Sync Manager 661 on the preferred personal computer 660. Furthermore, the modem 669 is only used to listen for synchronization requests. Additionally, if the user with the portable computer 610 is far away from the personal computer system 660 then a long-distance toll call will be required to synchronize with the personal computer system 660. Therefore an alternate system of remote synchronization is desirable.

Figure 6B:
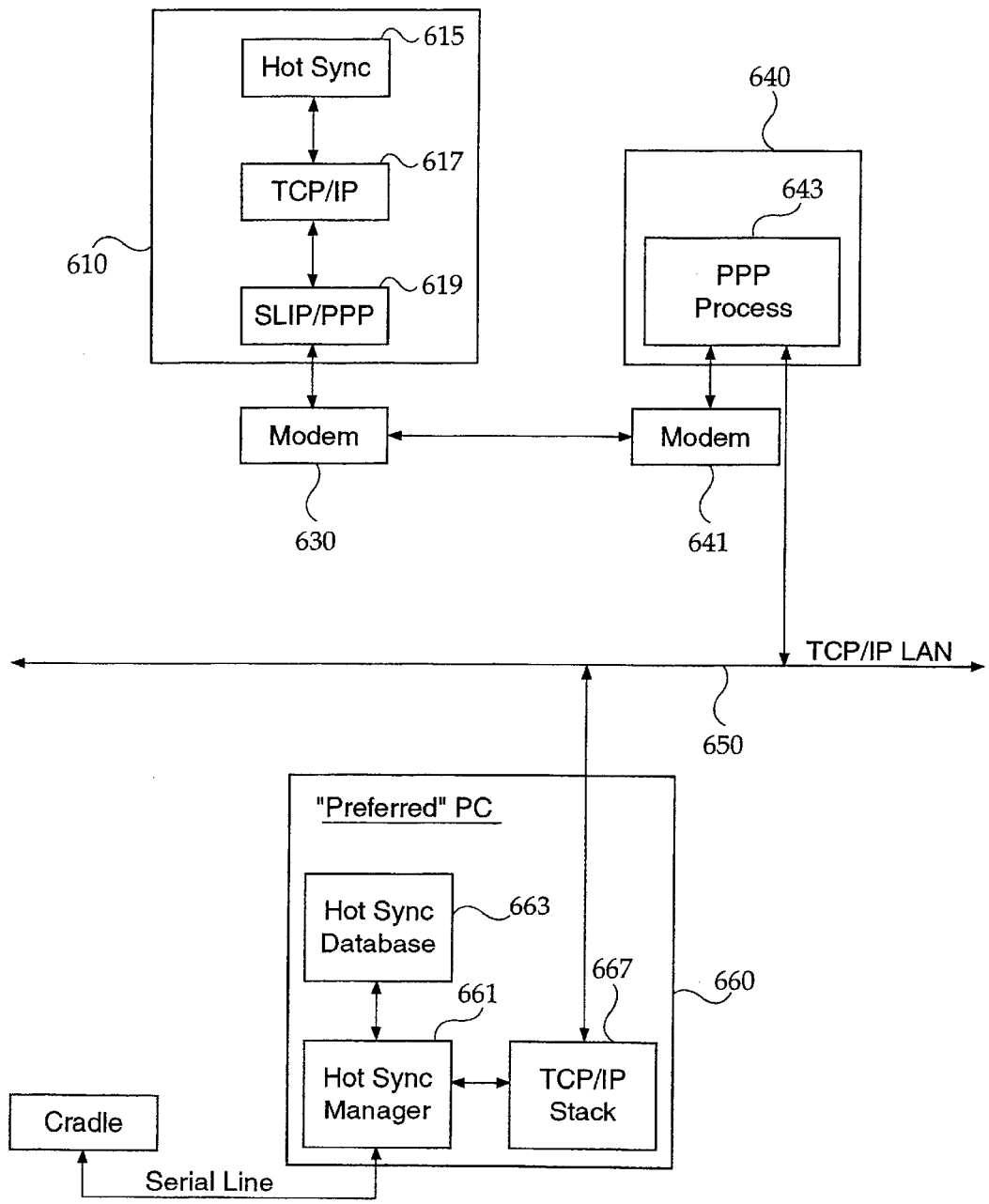
FIG. 6b illustrates a block diagram that depicts the software architecture for synchronizing a portable computer with a personal computer using a PPP connection between the portable computer system and a network coupled to the personal computer.

FIG. 6B illustrates an alternate embodiment of the remote synchronization system. In the alternate embodiment of FIG. 6B, the Hot Sync Program 615 communicates through a TCP/IP stack 617 with a Serial Line Internet Protocol (SLIP) or Point-to-Point Protocol (PPP) client program 619 before communicating with modem 630. Thus, by using the TCP/IP stack 617 and a SLIP or PPP client program 619, the Hot Sync Program 615 in FIG. 6B attempts a remote synchronization by performing a net synchronization across a SLIP or PPP link.

To remotely perform a net synchronization, the Hot Sync Program 615 first establishes a SLIP or PPP link with a server that is coupled to the same network as the preferred personal computer. Thus, the SLIP/PPP software using the modem 630 to dial and connect to a modem 641 on a remote access server 640. A SLIP/PPP server process 643 on the remote access server 640 will answer the call and establish a SLIP/PPP session. Once the SLIP/PPP session has been created the Hot Sync Program 615 can use the network address of the preferred personal computer to access the Hot Sync Manager Program on the preferred personal computer that is coupled to the TCP/IP Local Area Network 650. The Hot Sync Manager in the preferred personal computer will be monitoring the TCP/IP packets for a synchronization request across the TCP/IP LAN. If the Hot Sync Manager 661 on the preferred personal computer gets such a synchronization request packet, then the Hot Sync Manager 661 begins a synchronization with the portable computer system.

Figure 7:
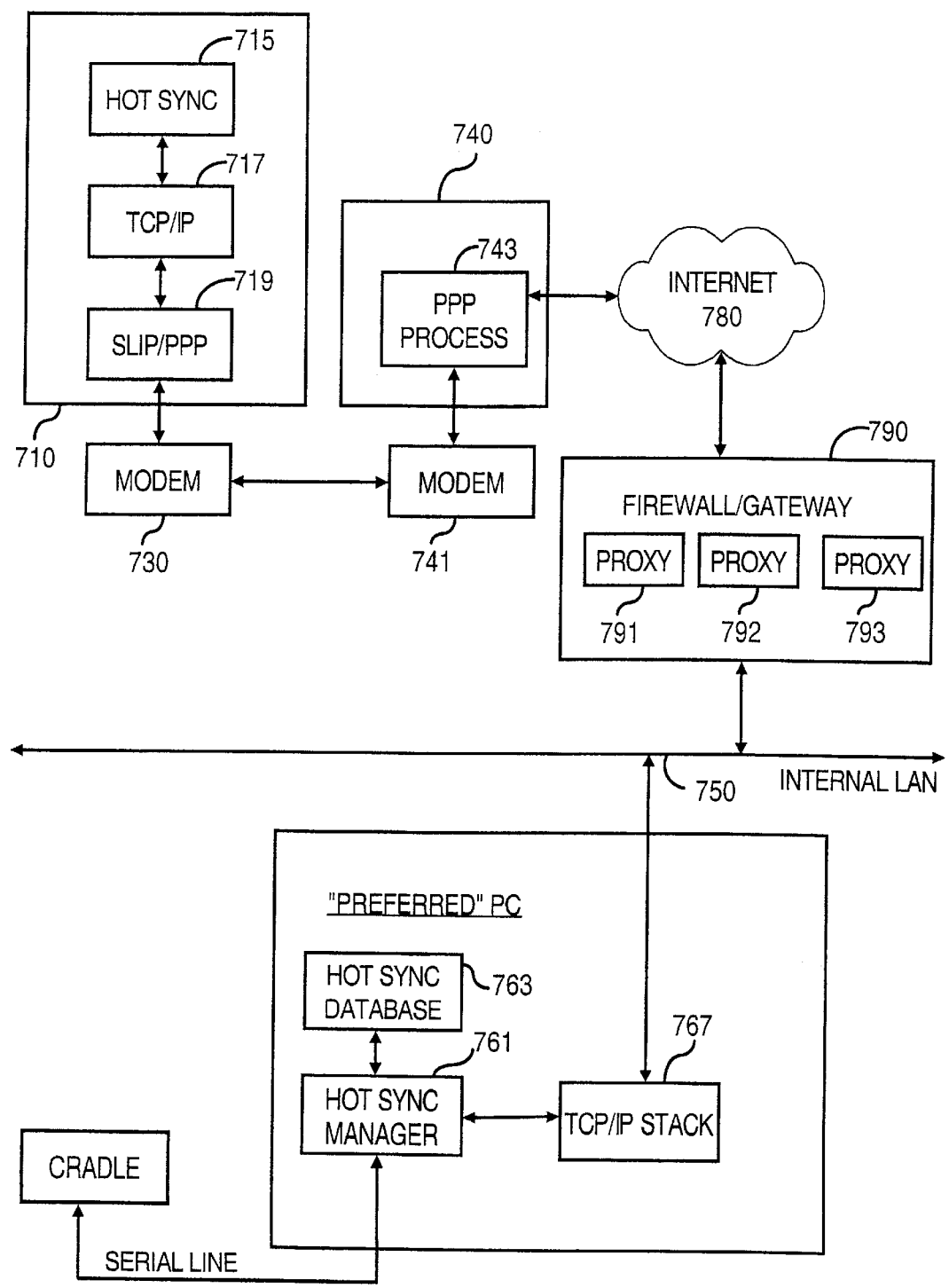
FIG. 7 illustrates a block diagram that depicts the software architecture for synchronizing a portable computer with a personal computer using a PPP connection between the portable computer system and an Internet Service Provider (ISP).

The TCP/IP based remote synchronization system can be performed using the global Internet. FIG. 7 illustrates an example of a portable computer system 710 synchronizing with a preferred PC 760 across the global Internet 780. Specifically the Hot Sync Program 715 in the global computer system establishes a PPP or SLIP connection with an Internet Service Provider (ISP) 740. The SLIP/PPP session is established between the SLIP/PPP client on the portable computer system 710 and a SLIP/PPP server 743 at the ISP 740. The SLIP/PPP server at the ISP 740 can communicate across the global Internet to any Internet addressable location. Thus, if the network address of the preferred personal computer 760 is accessible through the global internet 780 then the global computer system 710 can communicate with the preferred personal computer 716 to perform a remote synchronization.

Many businesses, however, install firewall servers or gateway servers 790 on their Local Area Network as illustrated in FIG. 7. The firewall server acts as a protection mechanism to protect the internal Local Area Network 750 of a company from attacks by unscrupulous Internet users. One method of protecting the internal Local Area Network is to require any communication with the global Internet to pass through a proxy application. In FIG. 7, proxy applications 791, 792 and 793 are used to bridge various communication protocols. Each proxy application filters the packets associated with its respective protocol before allowing the packets to access the internal Local Area Network 750. If such firewall system is installed at the corporation of a user who wishes to synchronize a portable computer, then a proxy application for the specific synchronization protocol may be required.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer implemented method for synchronizing records between computer systems, wherein the method is performed on a portable computer and comprises the steps of:
    connecting to a first computer using a local port, wherein the first computer is coupled to a second computer through a network;
    in response to the second computer executing a first set of synchronization instructions to synchronize a first set of records on the portable computer:
        receiving the first set of records from the second computer through the local port; and
        executing a second set of synchronization instructions for synchronizing the first set of records with a set of existing records that are stored on the portable computer.

2. The computer implemented method of claim 1, wherein executing a second set of synchronization instructions includes deleting one or more records from the set of existing records.

3. The computer implemented method of claim 1, wherein executing a second set of synchronization instructions includes replacing the set of existing records with the first set of records.

4. The computer implemented method of claim 1, wherein receiving the first set of records through the local port includes receiving one or more records for use with an address book application.

5. The computer implemented method of claim 1, wherein receiving the first set of records through the local port includes receiving one or more records for use with a calendar application.

6. The computer implemented method of claim 1, further comprising sending an identification of the portable computer to the second computer using the network.

7. The computer implemented method of claim 6, wherein sending an identification of the portable computer includes sending the identification that is based on a name of a user of the portable computer.

8. The computer implemented method of clam 1, further comprising:
    recognizing that the first computer is preferred for the portable computer; and indicating to a user that the second computer is not preferred prior to performing the step of receiving the first set of records from the second computer.

9. A computer implemented method for synchronizing records between computer systems, wherein the method is performed on a first computer and comprises the steps of:
    connecting to a portable computer using a local port;
    connecting to a second computer using a network;
    in response to the second computer executing a first set of synchronization instructions to synchronize a first set of records on the portable computer:
        transferring the first set of records sent from the second computer through the network to the portable computer using the local port; and
        enabling a second set of synchronization instructions to be executed on the portable computer in order to cause the first set of records to be synchronized with a set of existing records on the portable computer.

10. The computer implemented method of claim 9, further comprising executing at least a portion of the second set of synchronization instructions.

11. The computer implemented method of claim 9, wherein enabling a second set of synchronization instructions to be executed includes enabling one or more records to be deleted from the set of existing records.

12. The computer implemented method of claim 9, wherein enabling a second set of synchronization instructions to be executed includes enabling the set of existing records to be replaced with the first set of records.

13. The computer implemented method of claim 9, wherein transferring a first set of records includes transferring one or more records for use with an address book application.

14. The computer implemented method of claim 9, wherein transferring a first set of records includes transferring one or more records for use with a calendar application.

15. The computer implemented method of claim 9, further comprising providing an identification of the portable computer to the second computer.

16. The computer implemented method of claim 15, wherein providing an identification of the portable computer includes providing an identification of a user of the portable computer.

17. The computer implemented method of claim 9, further comprising:
    recognizing the first computer as preferred for the portable computer; and signaling to a user that the second computer is not preferred.

18. The computer implemented method of claim 9, wherein the step of transferring a first set of records port is performed in response to the steps of:
    recognizing the first computer as preferred for the portable computer; and causing a signal that informs a user that the second computer is not preferred to be provided to the user.

19. A computer implemented method for synchronizing records between computer systems, the method comprising performing the following steps on a first computer:
    the first computer connecting to a portable computer using a network connection between the first computer and a second computer and a local port between the second computer and the portable computer;
    said first computer executing a first set of synchronization instructions; and
    wherein execution of said first set of instructions by said first computer causes:
        said first computer to transfer a first set of records to the portable computer, and
        said portable computer to synchronize the first set of records received from the first computer with a set of existing records that are stored on the portable computer.

20. The computer implemented method of claim 19, wherein executing a first set of synchronization instructions causes comparing the first set of records to the set of existing records.

21. The computer implemented method of claim 19, wherein executing a first set of synchronization instructions causes one or more records to be deleted from the set of existing records.

22. The computer implemented method of claim 19, wherein executing a first set of synchronization instructions causes the set of existing records to be replaced with the first set of records.

23. The computer implemented method of claim 19, wherein executing a first set of synchronization instructions causes transferring one or more records for use with an address book application.

24. The computer implemented method of claim 19, wherein executing a first set of synchronization instructions causes transferring one or more records for use with a calendar application.

25. The computer implemented method of claim 19, wherein executing a first set of synchronization instructions is performed in response to recognizing that another computer is preferred for the portable computer.

26. The computer implemented method of 19, wherein executing a first set of synchronization instructions is performed in response to the steps of:
   recognizing that another computer is preferred for the portable computer; and
   causing a signal that informs a user that the second computer is not preferred to be provided to the user.

27. A portable computer comprising:
   a local port configured to locally connect to a first computer, wherein the first computer is coupled to a second computer over a network;
   a memory that stores a set of records; and
   a processor configured to:
      use the local port to connect to the first computer and communicate with a second computer that is coupled to the first computer over the network;
      wherein in response to the second computer executing a first set of synchronization instructions to synchronize a first set of records on the portable computer, the processor is configured to receive the first set of records from the second computer through the local port, and to execute a second set of synchronization instructions for synchronizing the first set of records with the set of existing records.

28. The portable computer of claim 27, wherein the processor is configured to execute the second set of synchronization instructions to replace the set of existing records with the first set of records.

29. The portable computer of claim 27 wherein the processor is configured to execute the second set of synchronization instructions to delete the set of existing records.

30. The portable computer of claim 27, wherein the processor is configured to execute an address book application, and wherein at least some of the first set of records includes records for use with the address book application.

31. The portable computer of claim 27, wherein the processor is configured to execute a calendar application, and wherein at least some of the first set of records includes records for use with the calendar application.

32. A computer readable medium for synchronizing records between computer systems, the computer readable medium carrying instructions for performing the steps of:
   connecting a portable computer to a first computer using a local port, wherein the first computer is coupled to a second computer through a network;
   in response to the second computer executing a first set of synchronization instructions to synchronize a first set of records on the portable computer:
      receiving the first set of records from the second computer through the local port; and
      executing a second set of synchronization instructions for synchronizing the first set of records with a set of existing records that are stored on the portable computer.

33. The computer readable medium of claim 32, wherein instructions for executing a second set of synchronization instructions include instructions for deleting one or more records from the set of existing records.

34. The computer readable medium of claim 32, wherein instructions for executing a second set of synchronization instructions include instructions for replacing the set of existing records with the first set of records.

35. The computer readable medium of claim 32, wherein instructions for receiving the first set of records through the local port include instructions for receiving one or more records for use with an address book application.

36. The computer readable medium of claim 32, wherein instructions for receiving the first set of records through the local port include instructions for receiving one or more records for use with a calendar application.

37. The computer readable medium of claim 32, further comprising instructions for sending an identification of the portable computer to the second computer using the network.

38. The computer readable medium of claim 37, wherein instructions for sending an identification of the portable computer include instructions for sending the identification that is based on a name of a user of the portable computer.

39. The computer readable medium of claim 32, further comprising instructions for performing the steps of: recognizing that the first computer is preferred for the portable computer; and indicating to a user that the second computer is not preferred prior to performing
   the step of receiving the first set of records from the second computer.

40. A portable computer comprising:
   a local port for connecting the portable computer to a first computer, wherein the first computer is coupled to a second computer over a network;
   means for connecting to the first computer using the local port;
   means for receiving the first set of records sent from the second computer over the network to the first computer and through the local port to the portable computer; and
   means for executing, in response to the second computer executing a first set of synchronization instructions to synchronize the first set of records on the portable computer, second set of synchronization instructions for synchronizing the first set of records with a set of existing records that are stored on the portable computer.

41. The portable computer of claim 40, wherein the means for executing a second set of synchronization instructions includes means for deleting one or more records from the set of existing records.

42. The portable computer of claim 40, wherein the means for executing a second set of synchronization instructions includes means for replacing the set of existing records with the first set of records.

43. The portable computer of claim 40, wherein the means for receiving the first set of records through the local port includes means for receiving one or more records for use with an address book application.

44. The portable computer of claim 40, wherein the means for receiving the first set of records through the local port includes means for receiving one or more records for use with a calendar application.

45. The portable system of claim 40, further comprising means for sending an identification of the portable computer to the second computer using the network.

46. The portable computer of claim 45, wherein the means for sending an identification of the portable computer includes means for sending the identification that is based on a name of a user of the portable computer.

47. The portable computer of claim 40, further comprising:
  means for recognizing that the first computer is preferred for the portable computer; and
  means for indicating to a user that the second computer is not preferred prior to performing the step of receiving the first set of records from the second computer.

48. The computer readable medium of claim 32, wherein the computer readable medium resides on the portable computer.

49. The computer readable medium of claim 32, wherein the computer readable medium resides on the first computer.

50. A computer-readable medium carrying one or more sequences of instructions which, when executed by one or more processors, causes the one or more processors to perform the method recited in claim 19.

51. A computer-readable medium carrying one or more sequences of instructions which, when executed by one or more processors, causes the one or more processors to perform the method recited in claim 20.

52. A computer-readable medium carrying one or more sequences of instructions which, when executed by one or more processors, causes the one or more processors to perform the method recited in claim 21.

53. A computer-readable medium carrying one or more sequences of instructions which, when executed by one or more processors, causes the one or more processors to perform the method recited in claim 22.

54. A computer-readable medium carrying one or more sequences of instructions which, when executed by one or more processors, causes the one or more processors to perform the method recited in claim 23.

55. A computer-readable medium carrying one or more sequences of instructions which, when executed by one or more processors, causes the one or more processors to perform the method recited in claim 24.

56. A computer-readable medium carrying one or more sequences of instructions which, when executed by one or more processors, causes the one or more processors to perform the method recited in claim 25.

57. A computer-readable medium carrying one or more sequences of instructions which, when executed by one or more processors, causes the one or more processors to perform the method recited in claim 26.

* * * * *